United States Patent Office 3,531,561
Patented Sept. 29, 1970

3,531,561
SUTURE PREPARATION
Yves Michel Trehu, Wilmington, Del., assignor, by mesne assignments, to Ethicon, Inc., a corporation of New Jersey
No Drawing. Filed Apr. 20, 1965, Ser. No. 449,621
Int. Cl. A61h 17/00
U.S. Cl. 264—210                               15 Claims

ABSTRACT OF THE DISCLOSURE

A surgical suture is prepared by extruding a high molecular weight polylactide and drawing the extrudate at a ratio of about 5/1 to about 11/1 in a nontoxic liquid that is nonsolvent for the lactide and is maintained at a temperature in the range of 80 to 140° C.

---

The present invention relates to the preparation of sutures, and, more particularly, to drawing of polymers and copolymers of lactic acids to yield a product suitable for use as a surgical suture.

It has been discovered that certain high molecular weight polylactides may be advantageously employed as a surgical suture when the polymers are drawn under selected conditions. Polylactides contemplated for use in the process of the present invention include polymers having a predominance of one antipodal species of α-hydroxy propionic acid and having an inherent viscosity of at least 1.0, and preferably above 1.2 as determined at 0.1 percent concentration in benzene at 25° C. These polymers have a predominance of recurring units of the formula

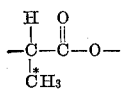

and may be made from the cyclic esters of the hydroxy acid derived from pure D(—) or L(+) lactic acids. An example of a class of polylactide copolymers within the above definition is a copolymer containing up to about 15 percent by weight of repeating units of the formula

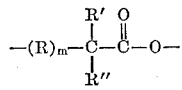

wherein R is lower alkylene, preferably methylene (—CH$_2$—) or ethylene (—CH$_2$CH$_2$—), m is 0 or 1, R' is hydrogen or lower alkyl, R" is hydrogen or alkyl of up to about 22 carbons when m is 0 and hydrogen or lower alkyl when m is 1, and can be the same as R' or different, is suitable for use in the present process.

Illustrations of the comonomers which can be employed with lactide to form copolymers include glycolide, β-propiolactone, tetramethylglycolide, β-butyrolactone, tetramethylglycolide, β-butyrolactone, gamma-butyrolactone, pivalolactone, and intermolecular cyclic esters of α-hydroxybutyric acid, α-hydroxyisobutyric acid, α-hydroxyvaleric acid, α-hydroxyisovaleric acid, α-hydroxycaproic acid, α-hydroxy-α-ethylbutyric acid, α-hydroxyisocaproic acid, α-hydroxy-β-methylvaleric acid, α-hydroxyheptanoic acid, α-hydroxyoctanoic acid, α-hydroxydecanoic acid, α-hydroxymyristic acid, α-hydroxystearic acid, α-hydroxylignocenic acid, and β-phenyllactic acid.

Suitable polymerization catalysts for the aforementioned monomers include zinc oxide, zinc carbonate, basic zinc carbonate, diethyl zinc, titanium, magnesium or barium compounds, litharge and similar materials.

Techniques such as disclosed in U.S. Pats. 2,703,316, issued Mar. 1, 1955 to A. K. Schneider, and 2,758,987, issued Aug. 14, 1956 to P. L. Salzberg, may be employed to produce polymers suitable for use in the present invention.

Usually polylactide polymer is prepared for suture use according to the instant invention by extruding polylactide polymer at a temperature of 185 to 215° C., quenching the extrudate thus obtained at or about room temperature and thereafter drawing the extrudate either in one stage or preferably in two stages with a draw ratio in the case of one-stage draw of about 5/1 to about 11/1.

The drawing is conducted in the presence of a liquid, preferably glycerine, which liquid is nontoxic toward body tissue and is a nonsolvent for the polylactide. Other liquids which are operable include, but are not limited to, the polyalkylene glycols, e.g., ethylene glycol and mineral oil. Water may be employed as the liquid, however, the drawing conditions must be selected to maintain the hydrolysis of the extrudate at an acceptable minimum. The drawing liquid must be maintained at a temperature in the range 80 to 140° C. The temperature range is critical in the present process.

Alternatively, the polylactide may be extruded in the form of a sheet which, after drawing, may be subdivided to form sutures, but preferably is extruded in the form of monofilament which is subsequently quenched and drawn, thereby eliminating the need for further division of the extrudate.

In the preferred embodiment of the present invention polylactide is extruded as a molten monofilament and the monofilament is quenched and drawn in two stages: the draw ratio in the first stage being in the range of 4.0/1 to 6.2/1; and the draw ratio in the second stage being in the range of 1.5/1 to 2.5/1. The liquid employed is maintained at a temperature of 80 to 100° C. and in the second stage at a temperature of 100 to 130° C. As indicated above, the drawing temperatures are critical in the present process.

In addition to the selection of a drawing temperature within the above-mentioned ranges, the draw ratio employed must be selected so that the product of the overall draw ratio multiplied by the inherent viscosity (as measured on spun, undrawn filament) does not exceed about 23. Preferably, this product should not exceed 20 in the case of a single-stage draw and 23 in the case of a double-stage draw.

Draw ratio, drawing rate and the drawing temperature are the important variables which affect the physical characteristics of the final product. When the feed rate of the filament is 5 feet/minute, with a 15" total contact distance of the filament in the glycerin bath, the optimum draw temperature may be defined by the formula

T±5° C.=2.37(D.R.)(η)+1.9(D.R.)+26(η)+22 wherein T is the optimum draw temperature, D.R. is the draw ratio and η is the inherent viscosity. In the case of double draw, the formula for the optimum draw temperature in the second draw bath is

T±5° C.=1.76(D.R.)(η)+1.5(D.R.)+28(η)+24

In the latter formula, the feed rate is 5 feet/minute into the first bath and a 5X draw is conducted at 90° C. in the first-stage draw. For a copolymer, the above formula is modified slightly as follows:

T$_c$±5° C.=(T+7)—mol percent comonomer wherein T$_c$ is the optimum draw temperature for the copolymer and T is the calculated optimum draw temperature for the homopolymer using the corresponding draw ratio and inherent viscosity.

The maximum drawing rate (feed rate X draw ratio) varies with the drawing temperautre. As the feed rate of the filament is increased at a constant draw ratio, a point is reached where the filament whitens and becomes weaker. This is an undesirable result and may be avoided by increasing the bath temperature until the filament no longer turns white. The optimum increased temperature $T_1$ may be determined according to the following formula $$T_1 \pm 5° C. = T_0 + 0.4(R-5)$$

where $T_0$ is the optimum drawing temperature for a feed rate of 5 feet/minute as determined by the formula given hereinabove and R is the modified feed rate in feet/minute.

The drawing not only improves the tensile strength of the filament or sheet, but also provides a substantial improvement in knot pull strength which is an important physical characteristic of a surgical suture.

The following examples are presented to illustrate and not to restrict the present invention. Inherent viscosity is determined on a spun, undrawn filament by dissolving the polymer in benzene to a concentration of 0.1% by weight and conducting the viscosity measurement at 25° C.

EXAMPLE 1

A polylactide homopolymer having an inherent viscosity of 2.5 was placed in a standard type of ram extruder having a ram ⅞" in diameter which was adjusted to extrude the molten lactide at ½ pound/hour with a barrel temperature of the ram at 200° C. to produce a monofilament having a diameter of 32 mils. The filament obtained from the extruder was quenched in water at 20° C. and wound upon a standard type of spool. The spooled filament was then directed to a standard type of 3 roll, two-stage drawing apparatus, using a common set of central draw rolls. Glycerin was placed in both stages of the drawing apparatus and the first stage was maintained at a temperature of 98° C. and the second stage at a temperature of 115° C. The filament was drawn 5.0 times in the first stage and 2.0 times in the second stage following which this oriented material was washed with water to remove any residual glycerin from the monofilament. After drawing, the filament was tested on a standard type of Instron Tester and found to possess the tensile strength of approximately 97,000 p.s.i. and a knot strength of 54,000 p.s.i. which indicates that the material would be satisfactory for use as a surgical suture, whereas the undrawn material would not be satisfactory.

EXAMPLE 2

The procedure described in Example 1 was repeated by extruding a copolymer containing 90 percent by weight of L(+)lactide and 11.6 percent by weight of the intermolecular cyclic ester of α-hydroxybutyric acid at a temperature at 185° C. and quenching the filament thus obtained in water at 20° C. The quenched filament (the inherent viscosity of the polymer in the filament form was 1.42) was drawn 7 times in glycerin at 94° C. and then drawn in glycerin at 122° C. to give an overall draw of 10 times. After washing, the filament was found to have a tensile strength of 66,300 p.s.i., an elongation at break of 22.3% and a modulus of $1.04 \times 10^6$ p.s.i. A filament with these physical properties is quite satisfactory for use as a surgical suture.

EXAMPLE 3

The procedure as outlined in Example 1 was repeated except that the filament was directed from the first draw bath to the water wash and then to the wind-up spool so as to permit a one-stage drawing operation. The polymer employed was a polylactide having an inherent viscosity of 1.6 and the glycerin was maintained at a temperature of 125° C. The filament was arranged so that at a rate of filament travel of 5 feet/minute, approximately 15" of contact of the filament with the liquid was obtained. The filament was drawn 10 times. The tensile strength of the filament increased from 5,000 to 85,000 p.s.i. resulting in a product which may be used as a surgical suture.

EXAMPLE 4

The procedure described in Example 3 was repeated by extruding a copolymer containing 88.4 percent by weight of L(+)lactide and 10 percent by weight of the intermolecular cyclic ester of α-hydroxyheptanoic acid at a temperature of 190° C. The monofilament thus obtained was quenched in water at 20° C. following which the quenched filament was drawn 8 times in contact with glycerin at 98° C. The drawn filament exhibited a tensile strength of 59,100 p.s.i. which is sufficiently strong for use as a surgical suture.

EXAMPLE 5

A poly L(−)lactide filament was drawn in glycerin using the double-draw technique. The temperature of the first bath was held at 84° C., that of the second bath at 109° C. Feed rate into the first draw bath was 5.5 feet/minute, the draw ratio across the first bath was 5 times and the total draw ratio was 7.1 times. The filament thus obtained was clear and strong. When the feed rate was increased to 27 feet/minute, the filament turned white and became weak. In order to obtain a clear, strong filament at the increased feed rate, the temperautre had to be raised to 114° C. in the second bath.

Additional experiments indicated that the DL–lactide copolymers ocntaining 5 to 15 percent by weight of comonomer and hydroxyacetic acid copolymers containing up to 10 percent by weight of comonomer could be satisfactorily oriented in a two-stage draw of the present invention.

I claim:

1. A process for the preparation of a surgical suture which comprises drawing a polylactide monofilament characterized by an inherent viscosity of at least 1.0 at a 0.1 percent concentration in benzene at 25° C. at a ratio of about 5/1 to about 11/1 in a liquid, which liquid is nontoxic toward body tissue, is a nonsolvent for said polylactide and is maintained at a temperature in the range 80 to 140° C.

2. A process for the preparation of a surgical suture which comprises drawing a polylactide monofilament characterized by an inherent viscosity of at least 1.0 at a 0.1 percent concentration in benzene at 25° C. at a ratio of about 5/1 to about 11/1 in a liquid, which liquid is nontoxic toward body tissue, is a nonsolvent for said polylactide and is maintained at a temperature in the range 80 to 140° C., and wherein the product of said ratio and said inherent viscosity is less than about 23.

3. A process for the preparation of a surgical suture which comprises extruding a polylactide having an inherent viscosity of at least 1.0 at a 0.1 percent concentration in benzene at 25° C., quenching the extrudate thus obtained and drawing the quenched extrudate at a ratio of about 5/1 to about 11/1 in a liquid, which liquid is nontoxic toward body tissue, is a nonsolvent for said polylactide and is maintained at a temperature in the range 80 to 140° C.

4. A process for the preparation of a surgical suture which comprises extruding a polylactide having an inherent viscosity of at least 1.0 at a 0.1 percent concentration in benzene at 25° C., quenching the extrudate thus obtained and drawing the quenched extrudate at a ratio of about 5/1 to about 11/1 in a liquid, which liquid is nontoxic toward body tissue, is a nonsolvent for said polylactide and is maintained at a temperature in the range 80 to 140° C., and wherein the product of said ratio and said inherent viscosity is less than about 20.

5. A process for the preparation of a surgical suture which comprises extruding a polylactide having an inherent viscosity of at least 1.0 at a 0.1 percent concentration in benzene at 25° C. to form a monofilament, quenching the monofilament at a temperature below 50° C., drawing the monofilament thus obtained at a ratio of about 5/1 to about 11/1 in a liquid which is nontoxic toward body tissue, is substantially inert toward polylactide and is maintained at a temperature in the range 80 to 140° C.

6. The process of claim 5 wherein said liquid is glycerin.

7. The process of claim 6 wherein said drawing is conducted at a temperature in the range 90 to 135° C.

8. The process of claim 7 wherein the product of said ratio and said inherent viscosity is maintained at a ratio less than about 23.

9. A process for the preparation of a surgical suture which comprises extruding a polylactide having an inherent viscosity of at least 1.0 at a 0.1 percent concentration in benzene at 25° C. at a temperature in the range 185 to 215° C., quenching the extrudate thus obtained and drawing the quenched extrudate at a ratio of about 5/1 to about 11/1 in a liquid, which liquid is nontoxic toward body tissue, is a nonsolvent for said polylactide and is maintained at a temperature in the range 80 to 140° C.

10. A process for the preparation of a surgical suture which comprises extruding a polylactide having an inherent viscosity of at least 1.0 at a 0.1 percent concentration in benzene at 25° C. at a temperature in the range 185 to 215° C. to form a monofilament, quenching the monofilament at a temperature below 50° C., drawing the monofilament thus obtained at a ratio of about 5/1 to about 11/1 in a liquid which is nontoxic toward body tissue, is substantially inert toward polylactide and is maintained at a temperature in the range 80 to 140° C.

11. The process of claim 10 wherein said liquid is glycerin.

12. The process of claim 11 wherein said drawing is conducted at a temperature in the range 90 to 135° C.

13. A process for the preparation of a surgical suture from a high molecular weight polylactide having an inherent viscosity of at least 1.0 at a 0.1 percent concentration in benzene at 25° C., which process comprises forming a molten monofilament of said polylactide, quenching the monofilament and thereafter drawing the monofilament in two stages in contact with a liquid, said liquid being substantially inert toward said polylactide and nontoxic toward body tissue and maintained at a temperature in the range 80 to 100° C. in the first stage and 100 to 130° C. in the second stage, the draw ratio in the first stage being in the range 4.0/1.0 to 6.2/1.0 and in the second stage in the range 1.5/1.0 to 2.5/1.0.

14. The process of claim 13 wherein the liquid is glycerin.

15. The process of claim 14 wherein the product of the overall draw ratio and said inherent viscosity is less than about 20.

References Cited
UNITED STATES PATENTS

| | | | |
|---|---|---|---|
| 2,457,804 | 1/1949 | Bower. | |
| 2,918,346 | 12/1959 | Paulsen. | |
| 3,297,033 | 1/1967 | Schmitt | 128—335.5 |
| 2,676,945 | 2/1954 | Higgens | 260—78.3 |
| 2,703,316 | 1/1955 | Schneider | 260—78.3 |

JULIUS FROME, Primary Examiner

H. MINTZ, Assistant Examiner

U.S. Cl. X.R.

128—335.5; 260—78.3; 264—290